Sept 17, 1957    H. M. GEYER    2,806,450
HYDRAULIC ACTUATORS
Filed Dec. 8, 1955
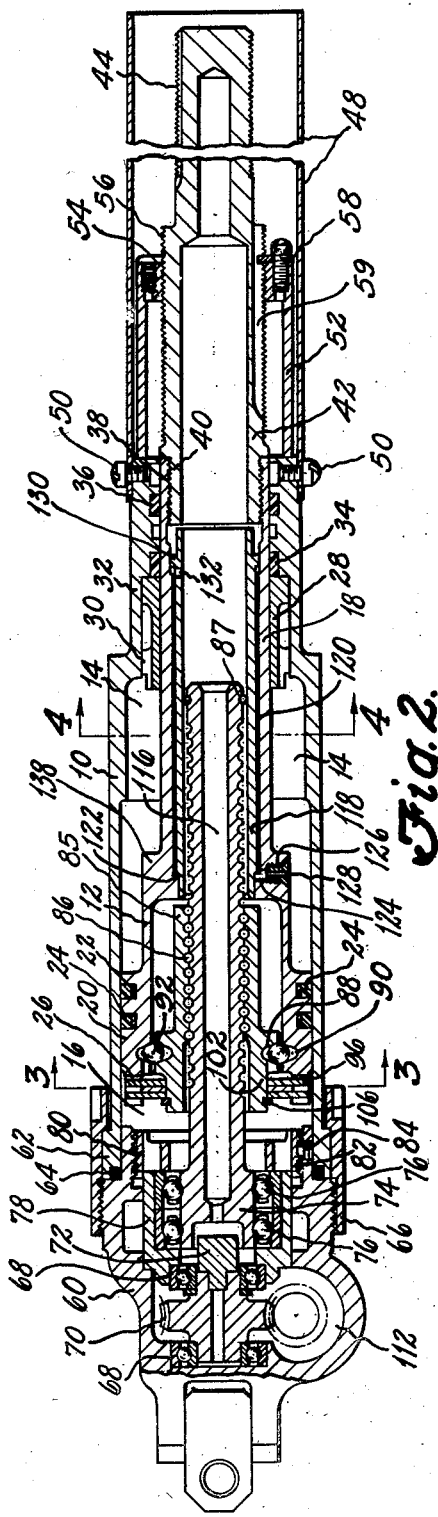
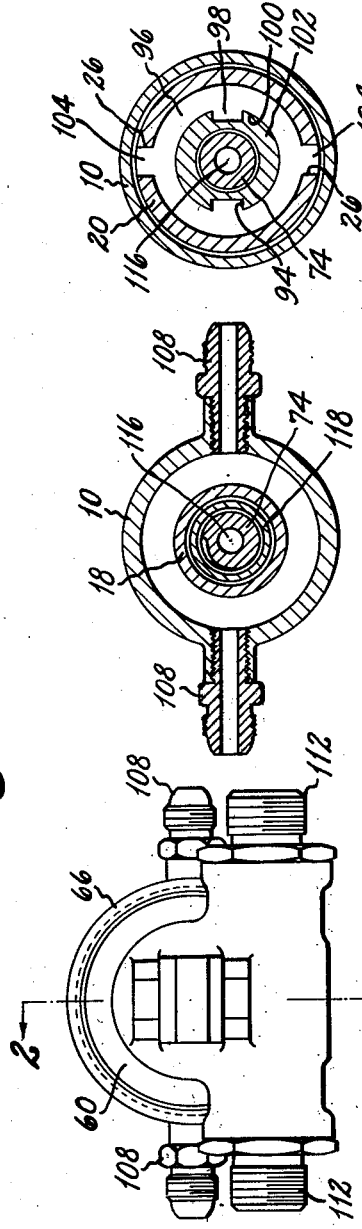
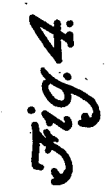
INVENTOR.
HOWARD M. GEYER
BY
Craig V. Morton
ATTORNEY

United States Patent Office 2,806,450
Patented Sept. 17, 1957

2,806,450

HYDRAULIC ACTUATORS

Howard M. Geyer, Dayton, Ohio, assignor to General Motors Corporation, Detroit, Mich., a corporation of Delaware Application December 8, 1955, Serial No. 551,823

7 Claims. (Cl. 121—38)

This invention relates to linear type fluid pressure or hydraulic actuator assemblies in which the work actuating member is subject to high temperatures such as with controls for afterburners on aircraft engines.

Previous actuators, when used in high temperature locations, tend to bind inoperatively and become unreliable with heat damaged seals due to excessive heat transfer through a work actuating member to a piston rod disposed in the actuator. A serious problem results, for example, when the temperature differential amounts to a degree of heat approximating 850° F. at the piston rod portion of an actuator compared with 450–500° F. in other portions of the actuator. The piston rod expands and binds in the actuator. The seals designed for use at 450° to 500° F. become damaged or burned due to excessive heat. When plural actuators are used in synchronism to distribute the work and avoid overload of individual units, as disclosed in my U. S. Patent 2,657,539, issued November 3, 1953, the same problem arises in such high temperature environments, with further difficulty due to rigid interconnection of a nut and piston integral with the piston rod for operatively engaging a screw shaft as shown in my patent.

An object of the present invention is to provide an actuator having cooling means permitting use at high temperature locations.

Another object is to provide an actuator disposed with a structural path for predetermined, continuous, recirculating flow of actuating and cooling fluid between extend and retract chambers effectively decreasing piston rod temperature to a degree comparable with the remaining portions of the actuator.

Another object is to provide a coupling between a piston and nut for an actuator having a rotatable member operatively connected with the nut and connectible with the rotatable member of like actuators to effect synchronous operation thereof in combination with a path for continuous, recirculating flow of actuating and cooling fluid permitting the actuator to be subjected to higher side loads in the locations noted.

The aforementioned and other objects are accomplished by the present invention in an actuator which includes a cylinder divided into extend and retract chambers by a reciprocal piston. As described in my aforementioned patent, the chambers communicate with a fluid source controlled by a selectively operative control valve causing fluid flow for fully retracting or extending the actuator. A work actuating member is exposed in a high temperature environment and transfers heat to a piston rod operatively interconnecting the parts. The piston rod is hollow and is disposed with a sleeve-like lining member or liner forming an annular cooling chamber, space, or path for metered flow of relatively cool actuating fluid around the periphery of the piston rod effectively reducing its temperature. The fluid can pass from one side of the piston to the other only by following a predetermined flow path through a metering aperture to the annular space between the liner and piston rod and then through a central aperture in the piston rod to the opposite side of the piston or vice versa.

For plural synchronous-operated actuators, the cooling arrangement is combined with a thrust bearing and coupling assembly permitting free flow of fluid around the nut operatively connecting the piston with a synchronizing screw shaft. The screw shaft may also be hollow providing an additional path for fluid flow to the opposite side of the piston once the fluid leaves the space for cooling the piston rod. This structure forms an actuator capable of handling higher side loads under high temperature conditions.

Further objects and advantages of the present invention will be apparent from the following description, the accompanying drawings and appended claims.

In the drawings:

Figure 1 is an end elevational view showing the extend and retract ports of a fluid operated actuator.

Figure 2 is a longitudinal view partially sectioned on line 2—2 of Figure 1 showing the present invention.

Figure 3 is a sectional view on line 3—3 of Figure 2 showing means for connecting a nut and piston assembly in the present invention.

Figure 4 is a sectional view on the line 4—4 of Figure 2 showing location of retract ports on the actuator.

The actuator illustrates in Figures 1 through 4 includes a cylinder 10 having disposed therein a piston 12 reciprocally mounted and dividing the cylinder into a retract chamber 14 and extend chamber 16. Forming an integral part of the piston is a hollow rod 18. The piston also includes a head portion 20 having annular grooves 22 in which suitable sealing or packing rings 24 are disposed to cooperate with the internal walls of the cylinder 10. The head portion of the piston also includes a pair of diametrically opposed, axially extending notches 26, the purpose of which will be discussed later. The piston rod slidably engages a bushing 28 press-fitted by means of lugs 30 to an inner periphery of a small diameter portion 32 of the cylinder. This bushing abuts a sealing means 34 disposed between the small diameter portion 32 of the cylinder and the piston rod 18. Another sealing means 36 as, for example, an O ring seal is disposed in an area adjacent sealing means 34 also engaging piston rod 18. The end of the piston rod remote from the piston head is provided with internal threads 38 operatively engaging cooperating external threads 40 formed on the outer periphery of one end of a work actuating member 42. The other end of the work actuating member is provided with external threads 44 for operatively engaging the rod with a work load, such as flaps for actuating and deactuating an afterburner (not shown). The work actuating member is contained in a housing 48 attached to the small diameter portion 32 of the cylinder by fastening means such as screws 50 suitably threaded to the cylinder through apertures in the housing member. The actuating member 42 is connected to a spacer 52 extending axially from the small diameter portion 32 of the cylinder in concentric relationship to the actuating member to a portion having internal threads 54 adjustably engaging centrally located threads 56 on the work actuating member. The spacer 52, as shown in Figure 2, abuts the end of the cylinder and limits movement of the piston to the left as viewed in Figure 2. Suitable retaining means may be attached to the threaded portion 54 as shown at 58 to set the adjustment of the spacer 52 with respect to member 42 in keyway 59.

As noted, the work actuating member is located so that it transfers heat from its load by conduction, or otherwise, to the piston rod which it engages through threads as detailed above. The temperatures transmitted in this manner may increase the temperature on the piston rod to approximately 850° F. and due to a difference in temperature ranging sometimes to 450° or 500° F. in other portions of the actuator, a binding action may result between the piston rod and bushing along slidably engaging surfaces detailed above. The seals are also damaged by excessive heat. The present invention overcomes this difficulty by providing cooling means for the piston rod.

Before describing an embodiment of such cooling means, the assembly of the actuator at the end opposite the work actuating member may be described to include the following parts. An end cover member 60 is fitted against the left side of shoulder 62 of the cylinder 10 with an O ring seal 64 sealing off the junction between these members held in fixed relationship by means of a shouldered sleeve 66 threaded to the end cover member and engaging the right end of shoulder 62 of the cylinder 10. The end cover member is disposed with an internally located pair of ball bearing assemblies 68 rotatably supporting a gear 70 which meshes with an interconnecting synchronizing shaft (not shown) as disclosed in my Patent 2,657,539. This gear is suitably connected by means of a coupling 72, for example, a tongue and groove connection, to a screw shaft 74. The screw shaft is provided with integral race ways for rotatably journalling said shaft by ball bearing means 76. The ball bearing means are supported in the end cover member by means of a sleeve 78 which also forms a partial support for the bearing means 68 rotatably supporting the gear 70. The bearing means 76 are retained in proper alignment by a retainer 80 threadedly engaging an internal threaded portion 82 of end cover member 60. The retainer is locked in position by suitable means such as a set screw 84 as shown in Figure 2.

A nut 85, internally threaded, engages the screw shaft 74 through the agency of a plurality of circulating balls 86. The nut 85 is provided with a V-shaped inner race 88 complementary to a substantially V-shaped outer race 90 formed in the head portion 20 of the piston 12. Rotatably disposed between these race ways is a ball bearing assembly 92 serving as a thrust bearing supporting the nut 85 in a cantilever manner with respect to piston 12 during axial movement of the nut along the threaded portion of the screw shaft 74. The screw shaft 74 is centered with respect to the nut 85 and thrust bearing support 92 where the outer end of the shaft is rotatably journalled by a ball bearing assembly 87 in a liner described below.

As shown in Figures 2 and 3, the nut 85 is suitably notched at 94 to provide diametrically opposite connecting portions for coupling means disposed between the piston and nut. This coupling provides an assembly such that the actuator can be subjected to higher side loads in combination with the thrust bearing assembly already described and also provides space and area between the nut and piston cooperating with cooling means as described below.

The coupling between the nut and the piston may comprise a plurality of discs 96 having tangs 98 extending radially inwardly into an aperture 100 of said discs for operatively engaging the notches 94 in a sleeve-like portion 102 of the nut 85. The discs 96 are also provided with a plurality of outwardly extending tangs 104 disposed at 90° to the inwardly extending tangs and diametrically opposed to operatively engage notches 26 formed integral with the head 20 of piston 12. The discs 96 are retained in cooperating relationship between the nut and piston head by means of snap rings 106 suitably attached to grooves in the sleeve portion 102 of the nut 85. The coupling, such as the "Oldham" type coupling described, prevents relative rotation between the piston 12 and nut 85. The piston 12 cannot rotate due to its threaded connection to load.

As shown in Figures 1 and 4, the actuator is provided with suitable fittings 108 serving as ports for supplying suitable actuating fluid, such as oil, to the retract chamber 14 formed between the inner periphery of the cylinder 10 and outer periphery of the piston 12 and piston rod 18. Similarly, the fittings 112, shown in Figure 1, serve as ports providing fluid communication with the extend chamber 16 located generally between the head portion 20 of piston 12 and end cover member 60. The extend chamber includes the volume in areas surrounding the bearing means 68 rotatably supporting the gear 70 and also communicates around the tongue and groove coupling 72 with an aperture 116 in the hollow screw shaft 74. The extend chamber also communicates with the ports 112 through the bearing means 76 rotatably supporting the screw shaft and through the retainer 82 which is suitably apertured. Fluid is supplied to the retract chamber 14 and extend chamber 16 as illustrated in my Patent 2,657,539. This fluid is used as the cooling agent in the present invention. It is circulated through the structure to be now described for the purpose of cooling the piston rod structure from the high temperature conducted through the actuating member and ranging upwards to 850° F. to decrease the temperature of the rod to a range within 450°–500° F. These temperatures are merely cited for purposes of illustration and do not in any way set forth a limitation of the cooling effects of the structure disclosed.

To make possible an even distribution of cooling agent along the periphery of the piston rod 18, a rod liner 118 is fitted to the inner periphery of the piston rod and forms a concentric annular chamber or space 120 between the rod liner and the inner periphery of the critical area of the piston rod 18. The rod liner engages an inwardly extending annular flange portion of the piston 12 to seal off the space 120 from possible leakage directly to the extend chamber 16. The space 120 communicates with the retract chamber 14 through an aperture 124 which is threaded to receive a screw 126 having a centrally disposed metering orifice 128 to gauge the rate of flow from the extend chamber 16 to the space 120 or vice versa. The size of this metering orifice may be varied, if desired, by inserting screws with various sizes of metering orifices therein. The rod liner 118 is disposed with and outwardly extending flange 130 integral with the sleeve near its end remote from the press fit with the piston 12 at the annular flange 122. The flange 130 engages the piston rod 18 with a tight sealing fit preventing leakage of any fluid traversing the space 120 for cooling purposes and insures alignment of the liner with respect to the piston rod at all times. An aperture 132 is provided in the rod liner adjacent to the flange 130 to provide communication between the space 120 and the interior of the rod liner 118. This aperture connects the path from the metering orifice 128 through the space 120 and aperture 132 to connect with a path between the screw shaft 74 and rod liner 118 between the balls 86 serving to interconnect the nut 85 and screw shaft 74. The path continues from the portion between the screw shaft and the rod liner to a portion between the nut 85 and piston 12 to flow between the thrust bearing means 92 escaping to the extend chamber 16 through space left by means of the coupling with discs 96 and the notches 26 and 94 of the piston and nut, respectively. The flow path is now completely disclosed between the retract and extend chambers of the fluid pressure actuator so that fluid having cooling effects on the piston rod area locally flows effectively in either direction depending upon which actuating chamber is pressurized.

An additional path of fluid flow after the fluid leaves the apertures 132 of the rod liner 118, when pressure actuation of the assembly is at a retracting position, is provided by the centrally disposed hollow aperture 116 of the screw shaft 74 communicating with the extend chamber generally and ports 112 supplying fluid thereto as mentioned earlier.

The linear fluid pressure actuator disclosed in the accompanying drawings is of the type requiring a maintained pressure to hold the actuator in working position. Thus, it is not necessary to provide a locking means for holding the working parts in a locked position when extended or retracted. Furthermore, this maintaining of pressure is well suited for providing continuous circulation of cooling fluid through the cooling means outlined above in accordance with the rate of flow permitted by the metering orifice provided. The piston is stopped in its fully retracted position when spacer 52 strikes the right end of the cylinder 10. Similarly, when the piston is moved to the fully extended position, the motion is stopped when a shoulder 138 of piston 12 engages the bushing 28 press-fitted to the cylinder 10 as described above, serving also as a rod guide member.

While the embodiment of the present invention as herein disclosed constitutes a preferred form, it is to be understood that other forms might be adopted.

What is claimed is as follows:

1. A fluid pressure actuator of the linear type comprising a work actuating member, a cylinder, a piston reciprocally disposed therein, a screw shaft rotatably journalled in the cylinder, a nut threadedly engaging said shaft, an Oldham coupling connecting said piston to said nut permitting adjustment therebetween, complementary bearing grooves formed on said piston and nut, a ball bearing assembly disposed within said grooves, a hollow piston rod connecting said piston with said work actuating member transferring heat to said rod, and structure disposed with said rod providing local cooling area therefor in a path from one side of the piston to the other side between the nut and piston.

2. An actuator assembly comprising a cylinder, a reciprocal member disposed therein, a screw shaft rotatably disposed therein, synchronizing gearing operative with said shaft, an internally threaded nut axially movable on said shaft, a work actuating element, means connecting said member with said work actuating element, a thrust bearing disposed between said nut and said member, a coupling connecting said member to said nut permittting adjustment therebetween, and a centering bearing assembly rotatably journalled between said shaft and said means, said assembly adapting the actuator to handle higher side loads.

3. A fluid pressure motor for actuating mechanism under high temperatures, comprising; a work actuating member, a casing, a fluid pressure reciprocal piston dividing said casing into opposed chambers, a hollow cylindrical member operatively connecting said piston with said work actuating member, a liner with a longitudinal passage therein disposed in said cylindrical member with one end of said liner engaging an inner periphery of said hollow member remote from said piston and the opposite end of said liner in sealing engagement with said piston, said liner and said hollow member forming an annular enclosed space therebetween connected by an outwardly extending orifice to one of the opposed chambers at an end of said hollow member adjacent said piston, and a direct passage communicating between the said longitudinal passage inside said liner with the said annular enclosed space, the said passage being located remote from said piston to complete a path totally within said fluid motor between the opposed chambers for local cooling of said hollow member relative to reciprocal movement thereof with respect to said casing.

4. The fluid pressure motor of claim 3 wherein the outwardly extending orifice from the annular enclosed space to the one of said opposed chambers has fitted therein a rate of flow metering means to gauge and limit cooling flow from the said one chamber to the enclosed space and vice versa.

5. A mechanism for actuating loads under high temperatures, comprising, a work actuating member, a casing, a reciprocable piston dividing said casing into extend and retract chambers, a hollow tubular member connecting said piston with said work actuating member transferring heat to said tubular member, a liner sealingly engaging said hollow member at one end and said piston at the other end thereby forming an annular cooling space between the inner periphery of said hollow member and exterior of said liner, a screw shaft extending coaxially within said liner, an internally threaded sleeve movable along said shaft, and connecting means between said sleeve and said piston providing open space between said piston and said sleeve, the open space therebetween communicating through a passage through said liner at an end remote from said piston, the extend and retract chambers always communicating by a path directly with each other through the open space between said piston and said sleeve, through said liner concentrically relative to said screw shaft to the passage through the end of said liner remote from said piston by way of the annular cooling space to an orifice between said piston and said hollow member in either direction of flow for reducing the temperature of said hollow tubular member relative to said casing.

6. The combination with an actuating mechanism having a cylindrical casing, a reciprocal piston with an integral hollow piston rod dividing said casing into extend and retract chambers, a work actuating member connected in heat transferring relationship to said rod, a tubular liner disposed in said rod forming a cooling space therewith, a screw shaft axially disposed concentrically within said liner to form a path between said shaft and said liner, an internally threaded nut operatively engaging said shaft, a disc coupling between said nut and said piston, a thrust bearing between said nut and said piston, said coupling and bearing disposed to complete the path between said shaft and said liner by way of a passage through said liner at an end thereof remote from said piston through the cooling space between said liner and said rod to an orifice adjacent said piston connecting the chamber outside said rod for communicating cooling flow in either direction directly between the chambers totally within the actuating mechanism.

7. In combination with a fluid pressure actuator including a cylinder, a reciprocal piston disposed therein forming extend and retract chambers, a hollow piston rod subject to high temperature and reciprocal with said piston, a liner extending longitudinally and concentrically of said rod forming a cooling space therebetween and in sealing engagement therewith at opposite ends thereof, a hollow screw shaft axially disposed concentrically within said liner to form a path through said shaft as well as between said shaft and said liner, an assembly comprising an internally threaded nut movable on said shaft, a plurality of discs disposed with inwardly and outwardly protruding diametrically opposite tangs, notched portions disposed on said nut mating with said inwardly protruding tangs, notch portions disposed on said piston mating with said outwardly protruding tangs, a thrust bearing disposed between said piston and nut, and centering means for said shaft with respect to the nut disposed between said shaft and said liner, the path through said shaft as well as between said shaft and said liner communicating through a passage in said liner at an end thereof remote from said piston and then continuing back toward said piston through the concentric cooling space between said liner and said rod through an orifice in the latter for flow in either direction through the path between the extend and retract chambers totally within said actuator locally cooling said rod.

References Cited in the file of this patent

UNITED STATES PATENTS

| | | |
|---|---|---|
| 1,469,689 | Prius | Oct. 2, 1923 |
| 2,217,239 | Smith | Oct. 8, 1940 |
| 2,490,174 | Teague | Dec. 6, 1949 |
| 2,657,539 | Geyer | Nov. 3, 1953 |
| 2,688,313 | Bauer | Sept. 7, 1954 |